(12) United States Patent
Boroditsky et al.

(10) Patent No.: US 7,546,039 B1
(45) Date of Patent: Jun. 9, 2009

(54) SYSTEMS, DEVICES, AND METHODS FOR CONTROLLING OUTAGE PROBABILITIES

(75) Inventors: Mikhail Boroditsky, South Amboy, NJ (US); Mikhail Brodsky, Millburn, NJ (US); Nicholas Frigo, Annapolis, MD (US); Peter Magill, Freehold, NJ (US)

(73) Assignee: AT&T Intellectual Property, II, L.P., Bedminster, NJ (US)

( * ) Notice: Subject to any disclaimer, the term of this patent is extended or adjusted under 35 U.S.C. 154(b) by 431 days.

(21) Appl. No.: 11/287,922

(22) Filed: Nov. 28, 2005

(51) Int. Cl.
  *H04B 10/00* (2006.01)
  *G02B 5/30* (2006.01)
  *G02B 27/28* (2006.01)

(52) U.S. Cl. .................. 398/152; 398/158; 359/494; 359/497; 359/499

(58) Field of Classification Search ................ 398/152, 398/158, 159; 359/494, 256, 497, 499, 484
See application file for complete search history.

(56) References Cited

U.S. PATENT DOCUMENTS

| | | | |
|---|---|---|---|
| 5,659,412 A * | 8/1997 | Hakki | 398/152 |
| 6,459,830 B1 | 10/2002 | Pua | |
| 6,556,732 B1 | 4/2003 | Chowdhury | |
| 6,647,176 B1 | 11/2003 | Pua | |
| 6,748,126 B2 | 6/2004 | Koch | |
| 6,768,875 B1 | 7/2004 | Eiselt | |
| 6,856,711 B1 | 2/2005 | Frigo | |
| 7,227,686 B1 * | 6/2007 | Yan et al. | 359/501 |

OTHER PUBLICATIONS

M. Karlsson, J. Brentel, P. A. Andrekson, "Long-Term Measurement of PMD and Polarization Drift in Installed Fibers," Journal of Lightwave Technology, vol. 18, No. 7, pp. 941-951, Jul. 2000.
C. T. Allen, et al., "Measured Temporal and Spectral PMD Characteristics and Their Implications for Network-Level Mitigation Approaches," IEEE Journal of Lightwave Technology, vol. 21, No. 1, pp. 79-86, Jan. 2003.
M. Brodsky, N. J. Frigo, P. Magill, "Polarization-Mode Dispersion of Installed Recent Vintage Fiber as a Parametric Function of Temperature" IEEE Photonics Technology Letters, vol. 16, 14 pages, 2004.
M. Brodsky, et al., "Field PMD Measurements Through a Commercial, Raman-Amplified ULH Transmission System" in Proc. LEOS PMD Summer Topical Meeting, 2003, pp. 15-16, Paper MB3.3.
M. Brodsky, et al. "Channel-to-Channel Variation of Non-Maxwellian Statistics of DGD in a Field Installed System," in Proc. ECOC, 2 pages, 2004, Paper Wel.4.1.
H. Sunnerud, M. Karlsson, P. A. Andrekson, "A Comparison Between NRZ and RZ Data Formats with Respect to PMD-Induced System Degradation," IEEE Photonics Technology Letters, vol. 13, No. 5, pp. 448-450, May 2001.

(Continued)

*Primary Examiner*—M. R Sedighian
(74) *Attorney, Agent, or Firm*—Michael Haynes PLC; Michael N. Haynes

(57) ABSTRACT

Certain exemplary embodiments comprise a method that can comprise, responsive to an instruction to change a setting of a polarization controller, automatically changing a first rotational speed of a birefringent plate associated with the polarization controller to orient the birefringent plate pseudo-randomly over time with respect to a predetermined axis.

19 Claims, 12 Drawing Sheets

1000

OTHER PUBLICATIONS

P. J. Winzer, et al., "Receiver Impact on First-Order PMD Outage", IEEE Photonics Technology Letters, vol. 15, No. 10, pp. 1482-1484, Oct. 2003.

H. Kogelnik, P. Winzer, private communications.. M. Karlsson, J. Brentel, "Autocorrelation Function of the Polarization Mode Dispersion Vector," Optics Letters, vol. 24, No. 14, pp. 939-941, Jul. 1999.

C. Antonelli, A. Mecozzi, "Statistics of the DGD in PMD Emulators," IEEE Photonics Technology Letters, vol. 16, No. 8, pp. 1840-1842, Aug. 2004.

M. Boroditsky, et al, "In-Service Measurements of Polarization-Mode Dispersion and Correlation to Bit-Error Rate," IEEE Photonics Technology Letters, vol. 15, No. 4, pp. 572-574, Apr. 2003.

M. Boroditsky, et al., "Outage Probabilities for Fieber Routes with Finite Number of Degrees of Freedom", IEEE Photonics Technology Letters, vol. 17, No. 2, pp. 345-347, Feb. 2005.

M. Birk, L. Raddatz, D. A. Fishman, P. Magill, and S. Woodward, "Field Trial of End-to-End OC-768 Transmission Using 9 WDM Channels Over 1000 Km of Installed Fiber," in Proc. OFC 2003, vol. 1, 290-291, Paper TuS4, 2003.

* cited by examiner

4000

10000

SYSTEMS, DEVICES, AND METHODS FOR CONTROLLING OUTAGE PROBABILITIES

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
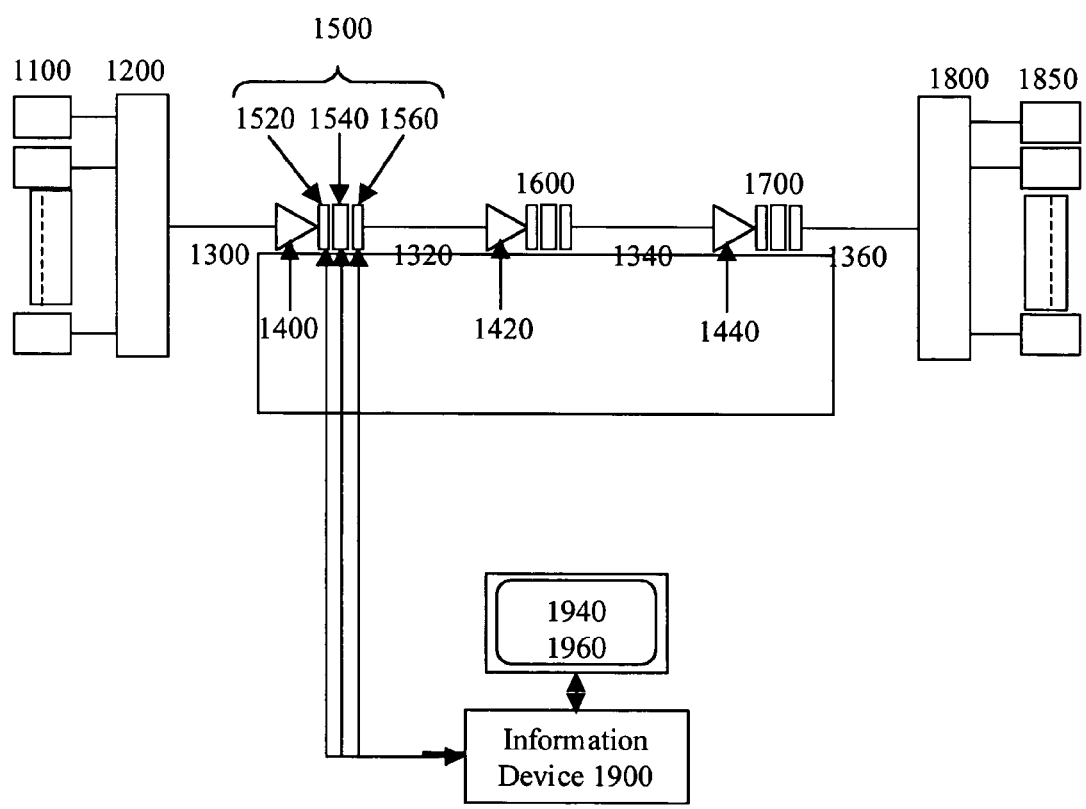
FIG. 1 is a side view of an exemplary embodiment of a system 1000.

Certain exemplary embodiments comprise a method that can comprise, responsive to an instruction to change a setting of a polarization controller, automatically changing a first rotational speed of a birefringent plate associated with the polarization controller to orient the birefringent plate pseudo-randomly over time with respect to a predetermined axis.

Telecommunications networks often comprise a significant proportion of optical components, such as optical fibers, which can be adapted to transmit light pulses that are indicative of machine-readable information.

Light can be described as a wave that comprises energy in the form of electric and magnetic fields. The electric and magnetic fields can be visualized as vibrating at right angles to the direction of movement of the wave, and at right angles to each other. Because light has both electric and magnetic fields, it can also be referred to as electromagnetic radiation. Light waves can be characterized by their wavelength, which is the distance between any two corresponding points on successive waves, usually peak-to-peak or trough-to-trough. Wavelengths of visible light range from 400 to 700 billionths of a meter. But the full range of wavelengths included in the definition of electromagnetic radiation extends from one billionth of a meter, as in gamma rays, to centimeters and meters, as in radio waves. A light wave also can be characterized by a frequency, which is the inverse of the wavelength of the light wave times the speed of light.

Optical fibers can be adapted to transmit relatively high bit rate signals with relatively low losses. High bit rate signals can be achieved via high bandwidth techniques such as wavelength division multiplexing (WDM), which can permit the simultaneous transmission of multiple wavelengths, each wavelength corresponding to a specific "channel."

Polarization refers to the spatial orientation of the electromagnetic waves that make up a beam of light. Light in which the spatial orientation of the waves is not random is said to be polarized. Although most light sources, such as the sun, emit essentially unpolarized waves, many physical processes, such as scattering in the atmosphere and reflection off glossy surfaces, impose a preferred polarization on light. Light from the telecommunication transmitters is often polarized.

Polarization Mode Dispersion (PMD) can affect signals transmitted through an optical medium. PMD is a form of signal distortion that can be caused by physical imperfections in the optical fiber. A perfect optical fiber with a core having a circular cross-section would have rotational symmetry about the longitudinal axis of that fiber, so that no preferred direction would exist for the polarization of the light carrying the optical signal. However, during fabrication, jacketing, cabling, and/or installation, perturbations in real fibers that distort this symmetry can occur, thereby causing the fiber to "look different" to various optical polarizations. One of the manifestations of this loss of symmetry is "birefringence," or a difference in the index of refraction for light that depends on the light's polarization. Light signals with different states of polarization (SOP) states can travel at different velocities in a real optical fiber media. In particular, there are two principal states of polarization (PSPs), in which the light travels the fastest and the slowest.

A birefringent optical fiber transporting a modulated optical signal can temporally disperse various wavelengths of the signal. In other words, an optical pulse, with a given optical polarization, can be formed to represent a "1" in a digital transmission system. With respect to a cross-section of an optical fiber, it is possible to arbitrarily designate an x-orientation as corresponding to a horizontal axis, and a y-orientation as corresponding to a vertical axis, and visualize the optical pulse entering the optical fiber at 45 degrees, such that it has an x vectorial component that is equal in magnitude to its y vectorial component. Due to birefringence in the optical fiber, the x-component might be slowed, such that it exits the fiber somewhat later than the y-component, thus stretching the duration of the pulse, and distorting its overall magnitude at a receiving detector with respect to time. Birefringence can lead to distortions in the received signal at the end terminal of the system. In certain exemplary embodiments, the temporal displacement of the two vectorial components, traveling in the "fast" and "slow" PSPs, increases with distance.

In a certain optical communications systems, birefringence is not necessarily constant but can vary randomly over the length of the transmission medium. Thus, the birefringence can change with position as the light propagates through the length of the fiber. In addition to intrinsic changes in birefringence resulting from imperfections in the fabrication processes, environmental effects such as, for example, temperature, pressure, vibration, bending, etc., can also change the overall birefringence, and thus can affect PMD. These effects can likewise vary along the length of the fiber and can cause additional changes to the birefringence. Thus, light that is in the "fast" SOP in one section of fiber might become be in the "slow" SOP at another section of the fiber. Instead of increasing linearly with distance, the temporal separations in the pulse replicas eventually can take on the characteristics of a random walk, and can grow on average with the square root of the distance.

Thus, in high-speed fiber optic networks, polarization mode dispersion (PMD) can present a challenge to network operators not only because of the signal degradation it causes, but also because the effects of PMD can vary over time.

The above discussion relates to "narrowband" signals, i.e., having a narrow enough bandwidth that the optical properties of the fiber can be characterized as operating at a single wavelength. This is commonly referred to as "first order PMD." Birefringence, however, can also vary with wavelength, such that each section of fiber may have slightly different characteristics, both in the magnitude and direction of the birefringence. As a consequence, after a long propagation through an optical medium, light from two neighboring wavelengths initially having the same polarization can experience what looks like a fiber with two different polarization characteristics.

Both the magnitude of a PMD vector, called the "differential group delay" or DGD, and the directions of the unit vectors parallel and anti-parallel to the PMD vector, the PSPs, can change with optical frequency. Often a DGD value can be used as indicative of a degree of PMD in a system. However; in certain exemplary embodiments, variations in PSPs as a function of optical frequency can cause distortion in an optical link not reflected by the DGD value.

PMD can change with changes in environmental conditions. Even small environmental changes can add perturbations to the birefringence of sections of the fiber and thereby move many of the imaged primitive vectors. Since PMD behavior can be modeled vectorially, environmental changes can change the vector sum of PMDs in an optical system. In certain exemplary embodiments, PMD can be affected by environmental conditions, which can cause changes to individual optical rotations in a particular link in an optical network.

Effects of PMD can be mitigated by utilizing a plurality of polarization controllers in an optical network to rotate the SOP of an optical signal. Polarization controllers can comprise birefringent elements that can be controlled to change the SOP of the signal in a prescribed manner. Polarization controllers can comprise a plurality of birefringent plates. Birefringent plates can be adapted to change the output SOP, depending on orientation of the plate material with respect to the SOP if the incident ray. Birefringent plates can change the orientation of the SOP vector of a given incoming signal having a particular wavelength. Each of the plurality of birefringent plates can be rotated at a unique rate, which can be fixed or variable.

Polarization controllers can be adapted to control and/or scramble light signals. When a polarization controller controls a signal, the plurality of birefringent plates can be rotated to a predetermined position in order to achieve a particular refraction of the light signals. When a polarization controller scrambles a signal, the plurality of birefringent plates comprised in the polarization controller can be independently turned continuously to provide a random orientation of each of the plurality of birefringent plates relative to a vertical axis as a function of time. To help the rate of rotation of a first plate be substantially independent from the rate of rotation of a second plate, the first rate of rotation can be an odd ratio (e.g., 0.031, 0.97, 1.116, 3.49, 25.6, 97, 177, or 311, etc.) relative to a rate of rotation of another birefringent plate in the polarization controller. Thus, particularly when used to scramble light signals, polarization controllers can be adapted to change statistical properties of DGD for a fiber optic system.

A rotational speed of a first birefringent plate of the plurality of birefringent plates, relative to a second birefringent plate of the plurality of birefringent plates, can be determined based upon a setting generated by an information device adapted to control birefringent plate rotation. The setting can be based upon a time over which an operator desires the PMD of the signal to approximate a Maxwellian distribution.

Experiments and simulations appear to indicate that differential group delay (DGD) statistics across channels can be approximated by a Maxwell distribution, resulting from many degrees of freedom. Maxwellian statistics can be similar for a plurality of individual frequencies and/or channels in a fiber if observed for a long enough time. Fiber routes can be chosen so that the probability of exceeding some maximally allowed DGD value is less than approximately $10^{-4}$ to less than approximately $10^{-6}$, assuming Maxwellian statistics.

The Maxwellian distribution is a mathematical expression defining a probability density function via the equation:

$$p_{\Delta\tau}(x)=(2/\pi)^{1/2}(x^2/\tau_{rms}^3)\exp\{-x^2/(2\tau_{rms}^2)\}$$

where: $\tau_{rms}$=the root-mean-square differential group delay (DGD); and x=is a DGD.

However, for a single fiber optic segment, channel, and/or wavelength, empirical observations indicate that the DGD probability density function might not be describable via a Maxwellian distribution. While empirical observations indicate PMD vectors can change over time over a single fiber optic segment, PMD vectors associated with the single channel in a given fiber optic segment might not exhibit Maxwellian statistics over time. Thus different channels can have different PMD distributions, such as a distribution that is non-Maxwellian.

Random rotations of PMD vectors via polarization controllers can increase the number of degrees of freedom associated with a fiber optic system. Empirical observations and theoretical calculations suggest that, via the use of a plurality of polarization controllers, DGD values of a channel or a plurality of channels for any fiber optic system can be substantially accurately modeled via the Maxwellian distribution.

Telecommunications customers can request, contract for, and/or expect a particular quality of service from a network service provider. The quality of service can be reflected in a contract, called a service level agreement, entered into with the network service provider. The service level agreement can contractually obligate a network service provider to maintain a predetermined level of telecommunications network reliability. The service level agreement can define what duration of service stoppage and/or difficulty qualifies as an "outage", and/or how many and/or frequently such outages may occur without the network service provider being in breach of the service level agreement, which can require the network service provider to provide substantial billing credits to the customer.

Maxwellian statistics can be used to predict the likelihood of an outage in a fiber optic system. In certain exemplary embodiments, slow random rotations of birefringent plates in each of a plurality of polarization controllers can be adapted to result in each channel in a fiber optic network comprising a DGD describable by Maxwellian statistics over the time of a Service Level Agreement. For a system reasonably describable by Maxwellian statistics, a probability density function for DGD can be integrated across a predetermined time range to determine a cumulative failure probability. The service level agreement can specify a threshold level for the cumulative failure probability. A rule of thumb for the rotations speed can be R~10/(N*T), where R is a needed number of rotations per unit time given in terms of the number of polarization controllers N, and the time period T of an SLA.

An outage can be described as an incident wherein a bit-error rate (BER) value of a particular fiber optic system exceeds a predetermined threshold. In certain exemplary embodiments, the optical fiber network can be designed, built, operated, and/or maintained to keep an outage probability for each channel below the predetermined threshold for the fiber optic network. Thus, utilizing slow random rotations of birefringent plates in a plurality of polarization controllers in a fiber optic network can result in a uniform level of reliability in the fiber optic network and/or compliance with service level agreements associated with customers utilizing the fiber optic network.

In certain exemplary embodiments, PMD might change only insignificantly over weeks and even months, essentially remaining 'frozen' over these timescales. At the same time significant variations of PMD can be found in longer amplified routes, comprising multiple fiber spans, such as buried, overhead, and/or underwater fiber spans. Some of these variations can be traced to polarization rotations in amplifier huts due to indoor temperature variation. In certain exemplary embodiments, dispersion compensating modules can produce a full rotation of the PMD vector in Stokes' space when heated by 2° C.

In certain exemplary embodiments, individual channels in a long system can have different DGD statistics, with the mean DGD and an associated standard deviation varying by a factor of approximately two across wavelengths. In certain exemplary embodiments, differences in the mean DGD and its standard deviation can be related to a number of rotation points, or 'hinges' (such as amplifier huts or bridges) in an optical network. In addition to DGD, system outages can depend on the signal launch conditions, modulation format, and details of an optical receiver associated with the optical network.

Temporal variations of the Differential Group Delay (DGD) in optical fibers can cause short-term outages for the high bit-rate Ultra Long Haul (ULH) systems. In certain exemplary embodiments, both the probability and the length of these outage events can be estimated, such as by assuming the DGD at a given frequency has a Maxwellian probability density function with a single parameter mean, which can be assumed as approximately the same for all frequencies within a predetermined fiber. In certain exemplary embodiments, the DGD can vary rapidly enough to sample a sufficient portion of a distribution of the DGD during a predetermined time period. Underlying changes in the fiber can occur in several dozens of places distributed along its length.

The DGD of completely buried fiber sections can be stable or "dead" for month-long timescales. DGD dynamics of installed ULH systems can be determined based upon a limited number of "hinges," acting as polarization controllers. Exposed sections of fiber such as bridge attachments (which can weakly respond to large diurnal changes in the ambient temperature) can cause changes to the DGD in an optical network. Certain system components can also cause changes to the DGD in the optical network. In particular, Dispersion Compensation Modules (DCM) can respond strongly to small hourly temperature variations within the buildings.

FIG. 1 is a side view of an exemplary embodiment of a system 1000, which can comprise a plurality of transmitter interfaces 1100. Plurality of transmission interfaces 1100 can be communicatively coupled to a multiplexer 1200. Multiplexer 1200 can be adapted to take signals from plurality of transmission interfaces 1100 and place them in wave division multiplexed channels.

Multiplexer 1200 can be adapted to transmit optical signals over a network of optical links 1300, 1320, 1340, 1360. System 1000 can comprise a plurality of amplifiers 1400, 1420, 1440. Amplifiers 1400, 1420, 1440 can be adapted to amplify optical signals in system 1000, for example, prior an entry of the optical signals into a plurality of polarization controllers 1500, 1600, 1700.

System 1000 can comprise a demultiplexer 1800, which can be adapted to receive wave division multiplexed optical signals and place them on a plurality of receiver interfaces 1850.

Each of polarization controllers 1500, 1600, 1700 can comprise a plurality of birefringent plates. For example, polarization controller 1500 can comprise polarization plates 1520, 1540, 1560. Each of birefringent plates 1520, 1540, 1560 can be equipped with separate drives adapted to be controlled at a predetermined rotational speed. The predetermined rotational speeds for birefringent plates 1520, 1540, 1560 can be set and/or controlled via an information device 1900. Information device 1900 can comprise a user interface 1940 adapted to render information regarding rotational speeds of birefringent plates 1520, 1540, 1560. Information device 1900 can comprise a user program 1960, which can be adapted to calculate and/or determine the predetermined rotational speeds for birefringent plates 1520, 1540, 1560.

Figure 2:
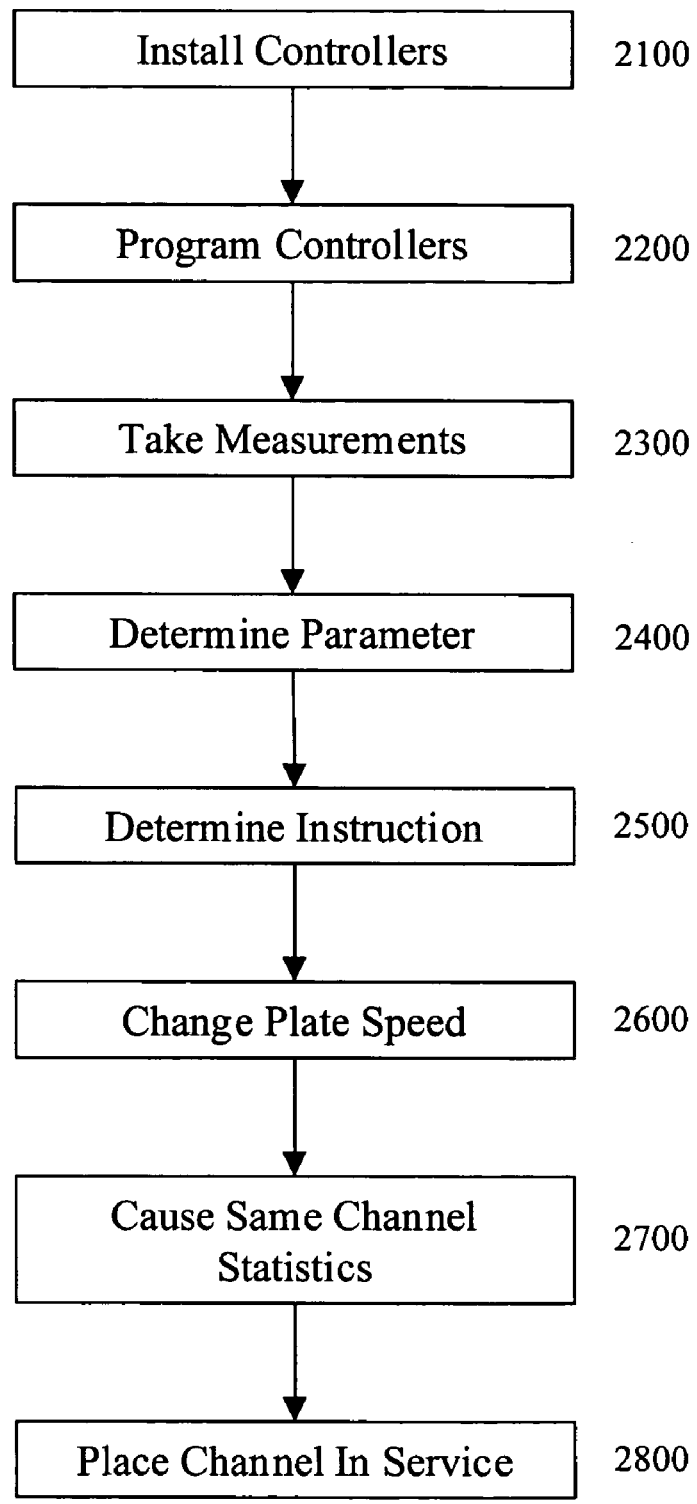
FIG. 2 is a flowchart of an exemplary embodiment of a method 2000.

FIG. 2 is a flowchart of an exemplary embodiment of a method 2000. At activity 2100, polarization controllers can be installed in an optical network. The polarization controllers can be distributed within the optical network at approximately equal distances. In certain exemplary embodiments, the polarization controllers can be randomly distributed within the optical network.

At activity 2200, the polarization controllers can be programmed. Rotational speeds of one or more birefringent plates in one or more polarization controllers can be programmed via an information device associated with the optical network. In certain exemplary embodiments, the polarization controllers can be programmed with one or more instructions comprising hardware, firmware, and/or software. The one or more instructions can be adapted to set a rotational speed for one or more birefringent plates in the polarization controllers. In certain exemplary embodiments the one or more instructions might not be adapted to be changed subsequent to an initial programming of the polarization controllers. In certain exemplary embodiments, changing the one or more instructions subsequent to the initial programming can involve changing hardware, firmware, and/or software. In certain exemplary embodiments, the one or more instructions can be changed via a communication from an information device via a network. In certain exemplary embodiments, the one or more polarization controllers can be programmed to receive one or more instructions for a setting change. In certain exemplary embodiments, the instruction might not be responsive to a detected error in a discrete optical communication. The instruction can be provided responsive to an indication related to an estimated Maxwellian probability density function associated with a Polarization Mode Dispersion vector.

At activity 2300, measurements can be taken in the optical network. For example, fault information can be obtained which can be used to estimate one or more statistical parameters associated with the optical network, such as speed of the PMD, PSP, or SOP variations.

At activity 2400, the one or more statistical parameters can be determined. In certain exemplary embodiments, the statistical parameters can be associated with a probability density function that approximates a Maxwellian distribution. In certain exemplary embodiments, the statistical parameters can be associated with a probability density function that is detectably different from a Maxwellian distribution.

At activity 2500, an instruction can be received from a network operator and/or determined based upon the one or more statistical parameters. The instruction can be provided responsive to an indication related to a probability density function associated with a Polarization-Mode Dispersion vector. The instruction can be adapted to cause a change in a rotational speed of one or more birefringent plate in one or more polarization controllers. The polarization controller can be one of a plurality of polarization controllers distributed within the optical network. The instruction might not be responsive to a detected error in a discrete optical communication.

At activity 2600, responsive to the instruction, the rotational speed of one or more birefringent plate in one or more polarization controllers can be set or changed. The rotational speed can be changed to orient the birefringent plate pseudo-randomly over time with respect to a predetermined axis. In certain exemplary embodiments, the rotational speed can be less than about one revolution per second. For example, the rotational speed can be relatively slow relative to measuring periods for obtaining statistical parameters such as less than approximately a one revolution per second, 5 seconds, 13.2 seconds, 21 seconds, 30 seconds, 1 minute, 3.4 minutes 7.9 minutes, 10 minutes, 30 minutes, 1 hour, 1.5 hours, 2 hours, 3 hours, 4.3 hours, 6 hours, 9.1 hours, 12 hours, 19.5 hours, 20 hours, 24 hours, 48 hours, 56.2 hours, 66.3 hours, 72 hours, etc. Rotational speed changes can be made in consideration of a rotational speed of at least one other birefringent plate associated with the polarization controller.

At activity 2700, statistics associated with a predetermined channel associated with the optical network can be caused to be approximately similar to other channels associated with the optical network.

At activity 2800, a channel can be placed into service. The channel can be characterized by statistics adapted to result in an outage probability that is below a predetermined threshold. The channel can be placed in a high availability service based upon a predetermined Polarization Mode Dispersion vector statistical parameter associated with the probability density function.

Figure 3:
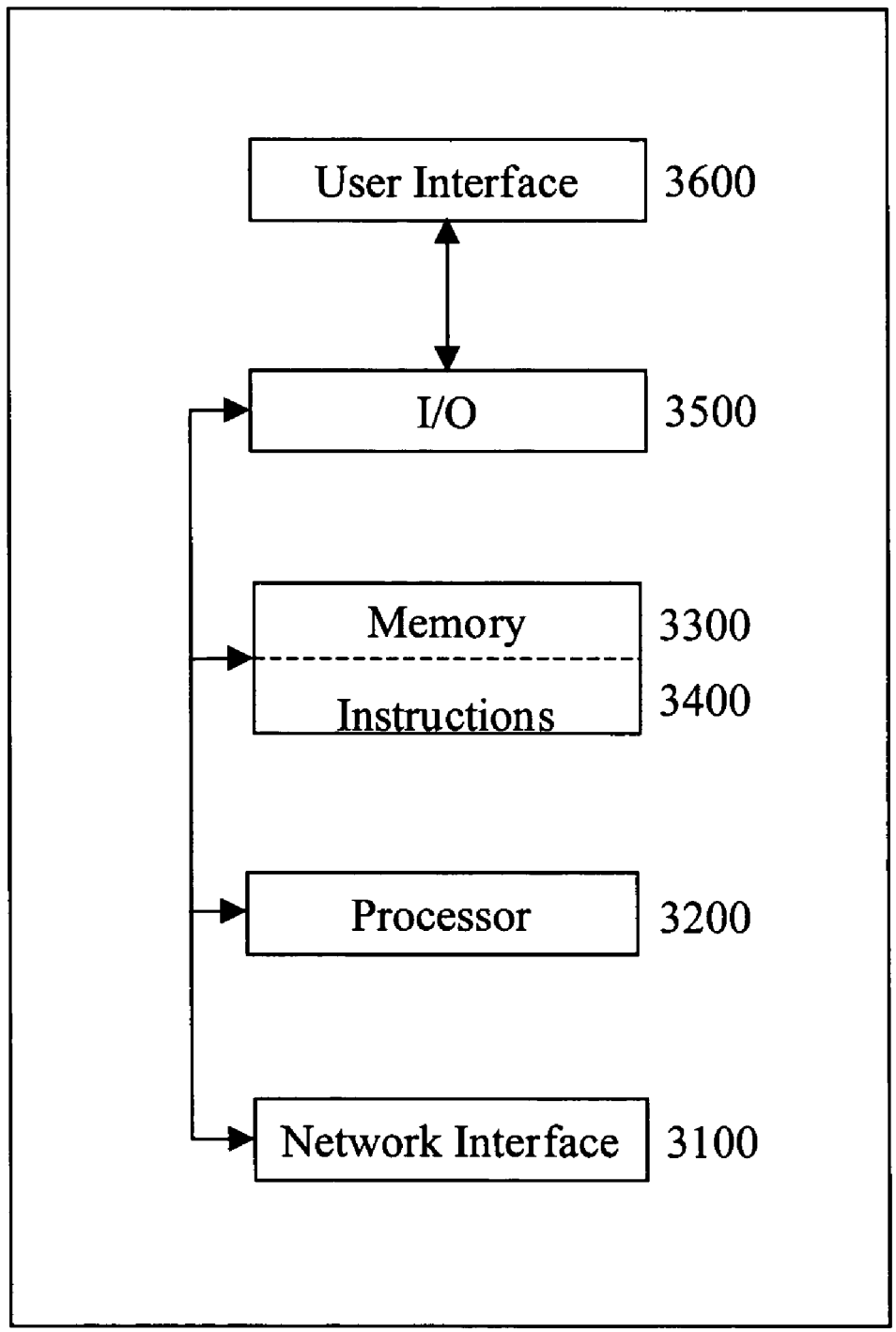
FIG. 3 is a block diagram of an exemplary embodiment of an information device 3000.

FIG. 3 is a block diagram of an exemplary embodiment of an information device 3000, which in certain operative embodiments can comprise, for example, information device 1900, of FIG. 1. Information device 3000 can comprise any of numerous components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can view a rendering of information related to controlling birefringent plate rotational speeds in order to manage Polarization Mode Dispersion statistical parameters.

A simulation was performed to study outages statistics among multiple channels in an optical network with a given root-mean-square DGD $\tau_{rms}$. The simulation was performed in a system characterizeable as comprising $N_s$ 'frozen' fiber segments, connected by $N=N_s-1$ "hinges," that is polarization controllers. Each segment's DGD was assumed to have a Maxwellian distribution in frequency with rms DGD $\tau'_{rms}=\tau_{rms}/\sqrt{N_s}$. The validity of Maxwellian statistics, which allows for arbitrarily high values in frequency was not provable at high DGD values, but was assumed as a convenient approximation. The simulation frequencies of interest, or channels, were assumed to be statistically independent, that is, separated by several frequency correlation bandwidths. For example, a 1000 km 10 Gb/s system with a mean DGD of $\tau_{rms}=10$ ps comprising 10 segments PMD of $\tau'_{rms}=3$ ps was simulated. The assumed frequency correlation bandwidth in every segment was about $0.5/\tau'_{rms}=160$ GHz. This bandwidth was assumed to divide an optical spectrum into statistically independent channels of 160 GHz, and formed an upper bound on the width of the independent channels for longer systems. Many tens of statistically independent frequency bands in L or C bands were assumed and instantaneous DGD values for every channel in every fiber segment were drawn at random from a Maxwellian distribution. Thus the DGD's probability density functions, and, hence outage probability for every channel, were different and were computed utilizing analytical results for PMD emulators with fixed sections.

Figure 4:
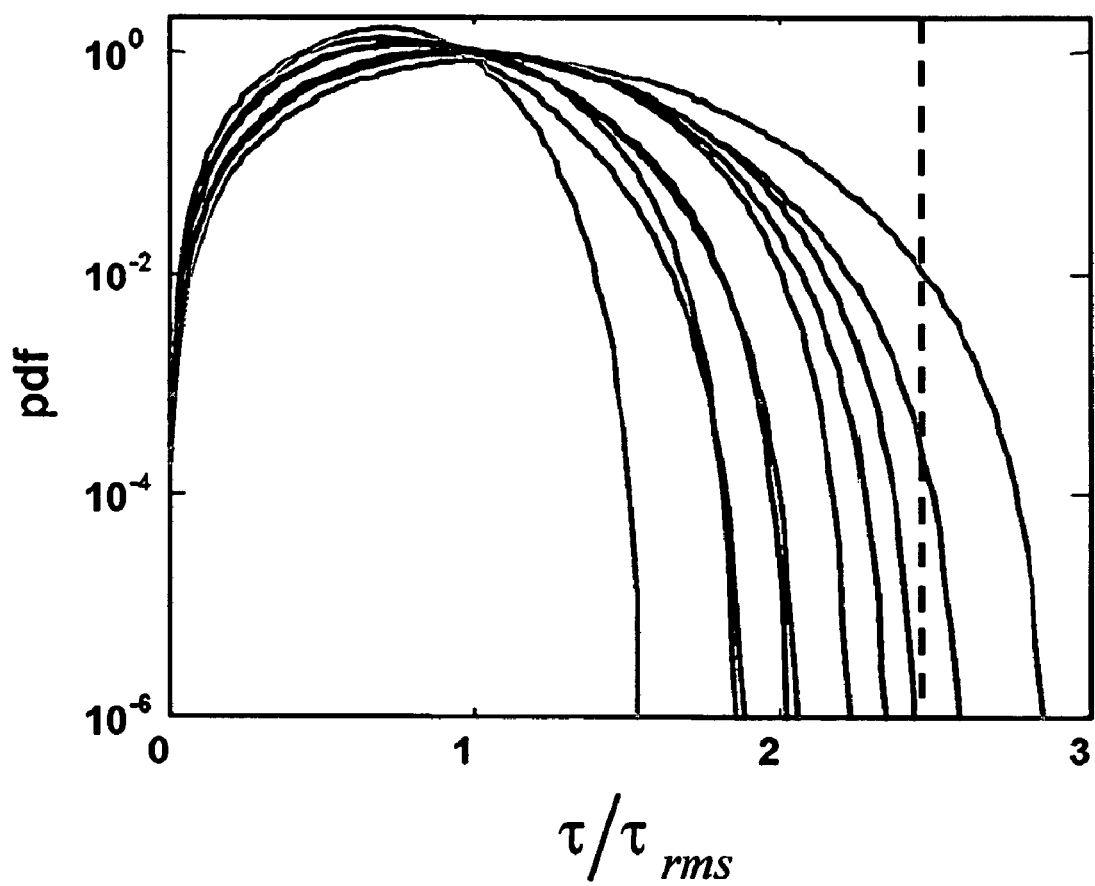
FIG. 4 is a graph 4000 of sample DGD probability density functions for ten statistically independent channels in a six segment system.

FIG. 4 is a graph 4000 of sample DGD probability density functions for ten statistically independent channels in a six segment system. That is 6 draws from the distribution were combined randomly (i.e. at hinges) as PMD's to create channel DGD's. The total DGD did not exceed the sum of the 6 segment DGD's, as shown by the steepness of the curves. Consequently, for a given outage threshold, such as $\tau_{max}=2.5\tau_{rms}$, most of the channels in FIG. 4 had an outage probability of approximately zero.

The outage probability can be a measure of the channel reliability with respect to PMD. In a system with a finite number of polarization controllers, and non-Maxwellian PMD statistics, different channels had different outage probabilities. A spread of the outage probabilities was characterized using respective probability density functions. The following procedure computed probability density functions of an outage probability. These distributions were assumed to depend both on a threshold DGD defining an outage and on a number of degrees of freedom, related to an assumed number of hinges. In this simulation hinges were assumed to rotate isotropically through all $4\pi$ steradians. In certain exemplary embodiments, limiting a range of rotation can increase a spread of outage probabilities among channels.

Figure 5:
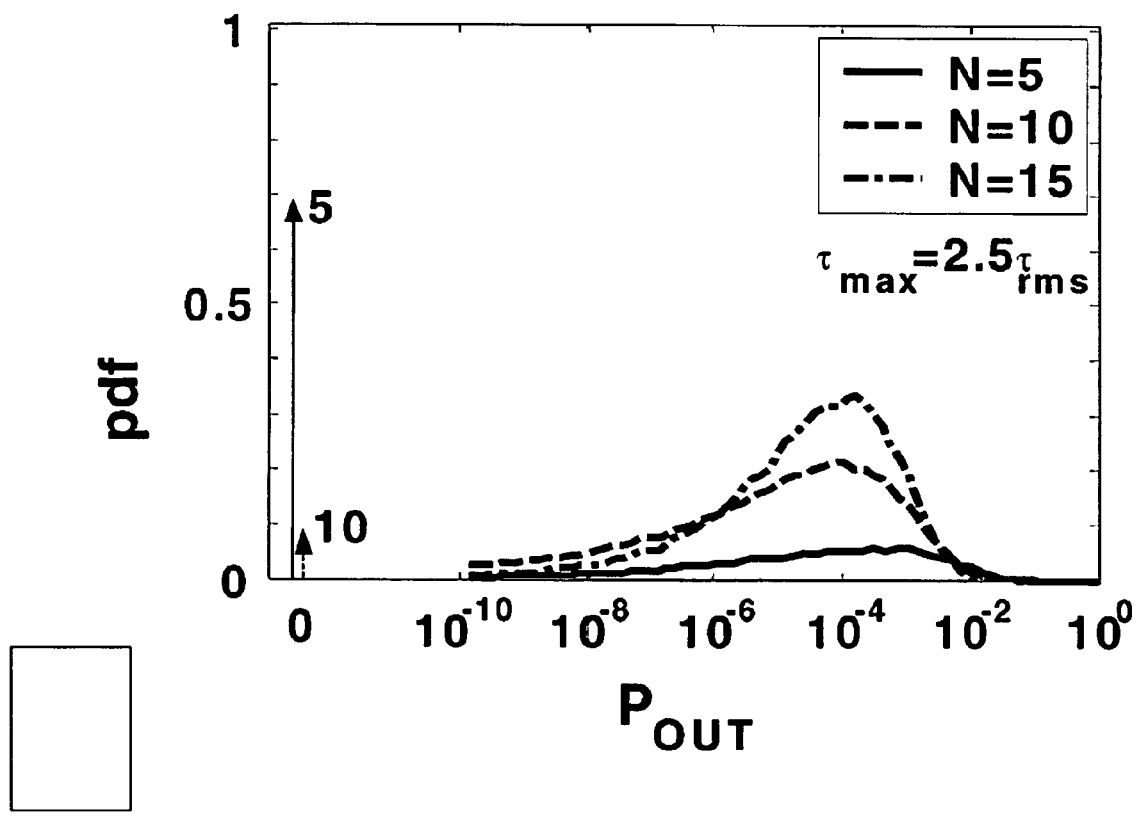
FIG. 5 is a graph of numerically estimated probability density functions of the outages.

FIG. 5 is a graph 5000 of numerically estimated probability density distributions for the outage probabilities $P_{out}$ of a system with maximum tolerable $\tau_{max}=2.5\tau_{rms}$ with differing numbers of hinges in that system (N=5, 10, 15).

Figure 6:
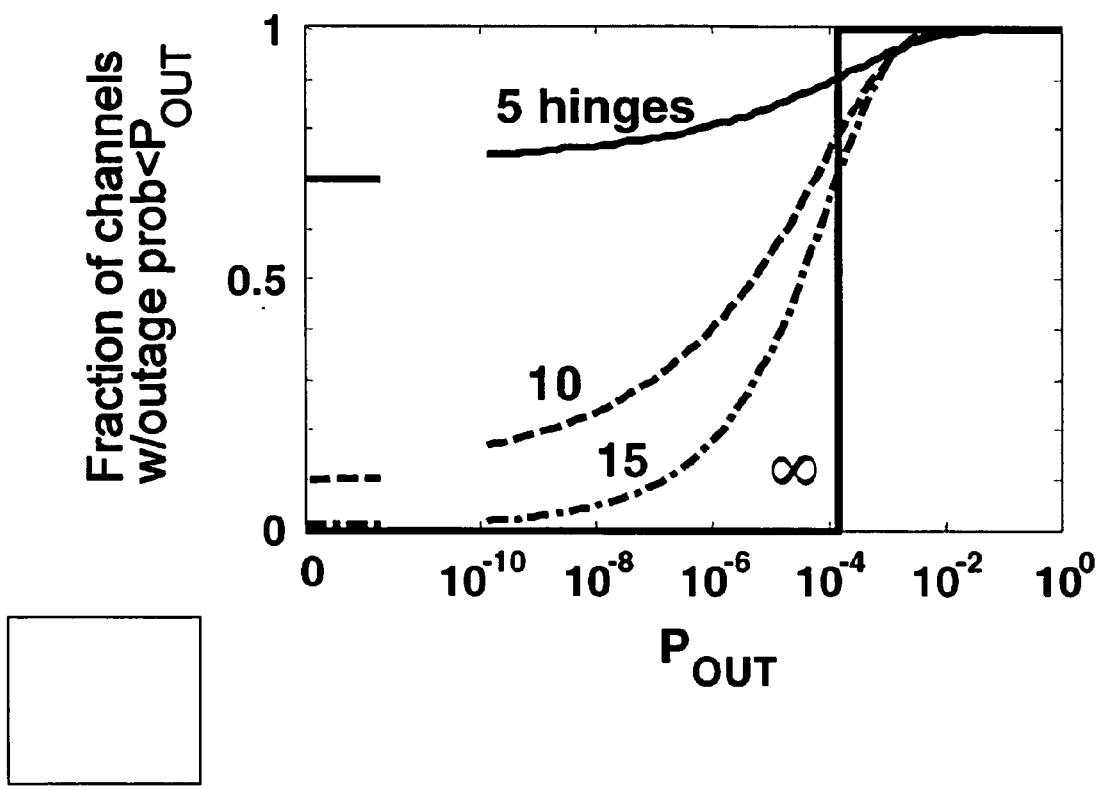
FIG. 6 is a graph 6000 of numerically estimated cumulative probability functions.

FIG. 6 is a graph 6000 of numerically estimated cumulative probability distributions for the outage probabilities $P_{out}$ of a system with maximum tolerable $\tau_{max}=2.5\tau_{rms}$ with differing numbers of hinges in that system (N=5, 10, 15).

Assumed systems utilized 35000 realizations of independent channels with a same ensemble mean PMD to determine outage statistics.

Since a range of outage probabilities of interest that covered several orders of magnitude, $P_{out}$ was plotted on a logarithmic scale. A fraction of channels that did not experience an outage is represented by a delta-function at zero in FIG. 5, whose weight is equal to the probability for the sum of Ns random Maxwellian variables to be less than τmax. For verification purposes, this quantity was also computed analytically via convolutions.

FIG. 6 is a graph showing cumulative distributions of $P_{out}$ corresponding to the probability density functions of FIG. 5; that is, a probability for a channel to operate with outage probability less than the abscissa. The cumulative distribution of $P_{out}$ was assumed as an integral of the functions plotted in FIG. 5 from 0 to the abscissa, and at a limit of $P_{out}=0$ the curves tend to a constant value, equal to the fraction of outage-free channels, and to the weight of the delta-functions in FIG. 5. The simulation indicates that as a number of degrees of freedom increases, system starts to behave like a Maxwellian system, and plots in FIG. 6 tend toward the step-like shape corresponding to the situation when all channels have identical Maxwellian statistics in time, and therefore a same outage probability, $2 \cdot 10^{-4}$ in this case. The same trend manifests itself in FIG. 5 in sharpening of the peak around $P_{out}=2 \cdot 10^{-4}$ and reduction of the delta-function weight at $P_{out}=0$ as an assumed number of hinges increased. A reduction of degrees of freedom in a system can be considered as 'washing out' the step-function describing the outage probability. As a result, some channels have outage probability smaller than (but some have an outage probability higher than) expected from a Maxwellian distribution.

Figure 7:
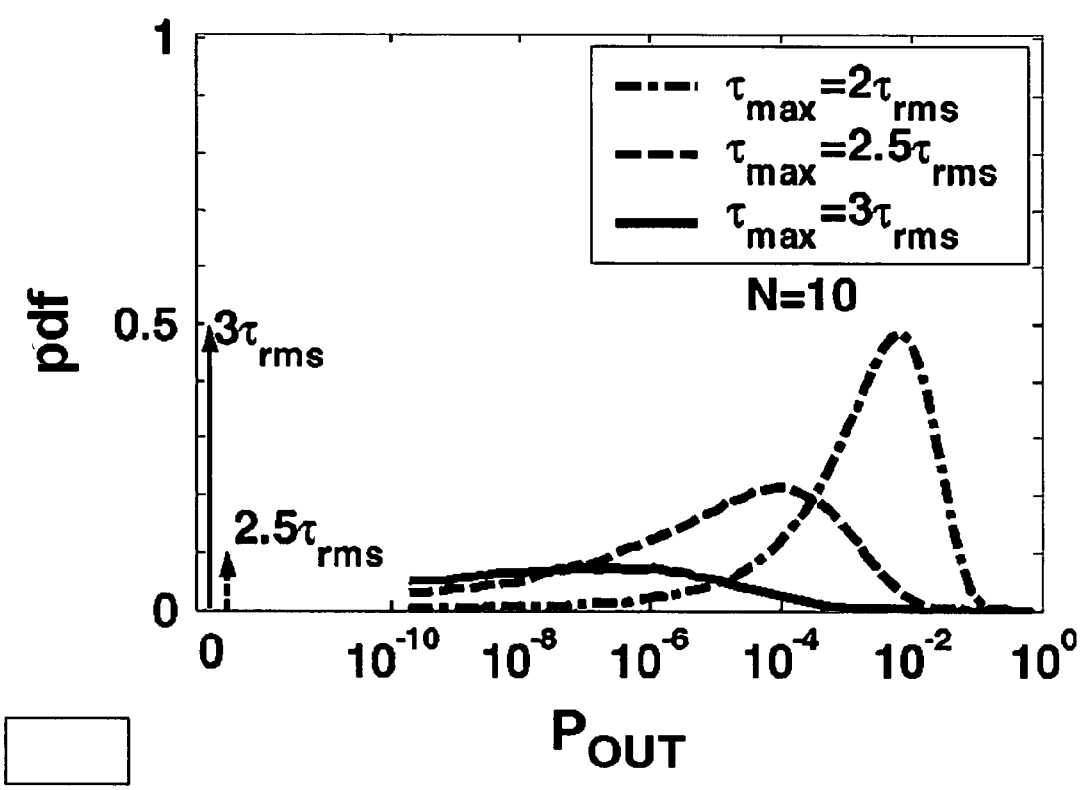
FIG. 7 is a graph 7000 comparing outage probability distributions.

FIG. 7 is a graph 7000 comparing outage probability density functions in a 10-hinge system with different values of maximum allowed DGD $\tau_{max}=2\tau_{rms}$, $2.5\tau_{rms}$, $3\tau_{rms}$, the first being the least PMD tolerant. In the two latter cases some of the channels were calculated to be outage-free, as indicated by delta-functions at $P_{out}=0$.

Figure 8:
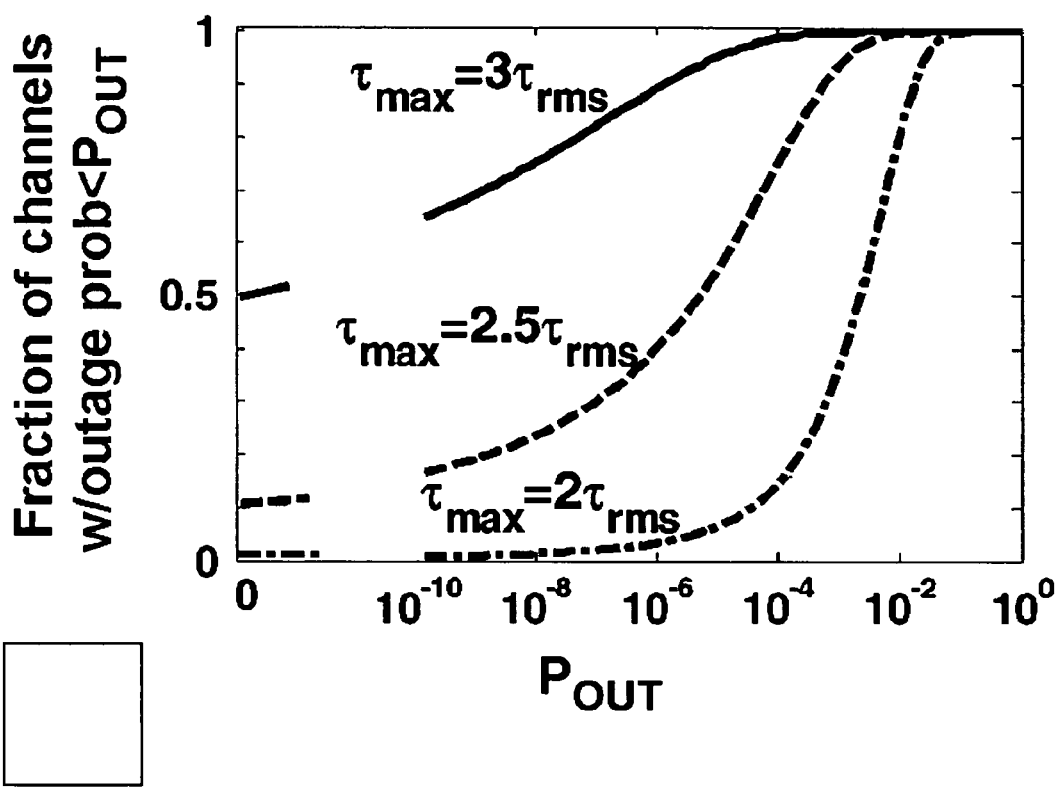
FIG. 8 is a graph 8000 comparing cumulative outage probability functions for different PMD tolerance of the receiver.

FIG. 8 is a graph 8000 comparing cumulative outage probability distributions in a 10-hinge system corresponding to the probability density functions illustrated in FIG. 7.

Figure 9:
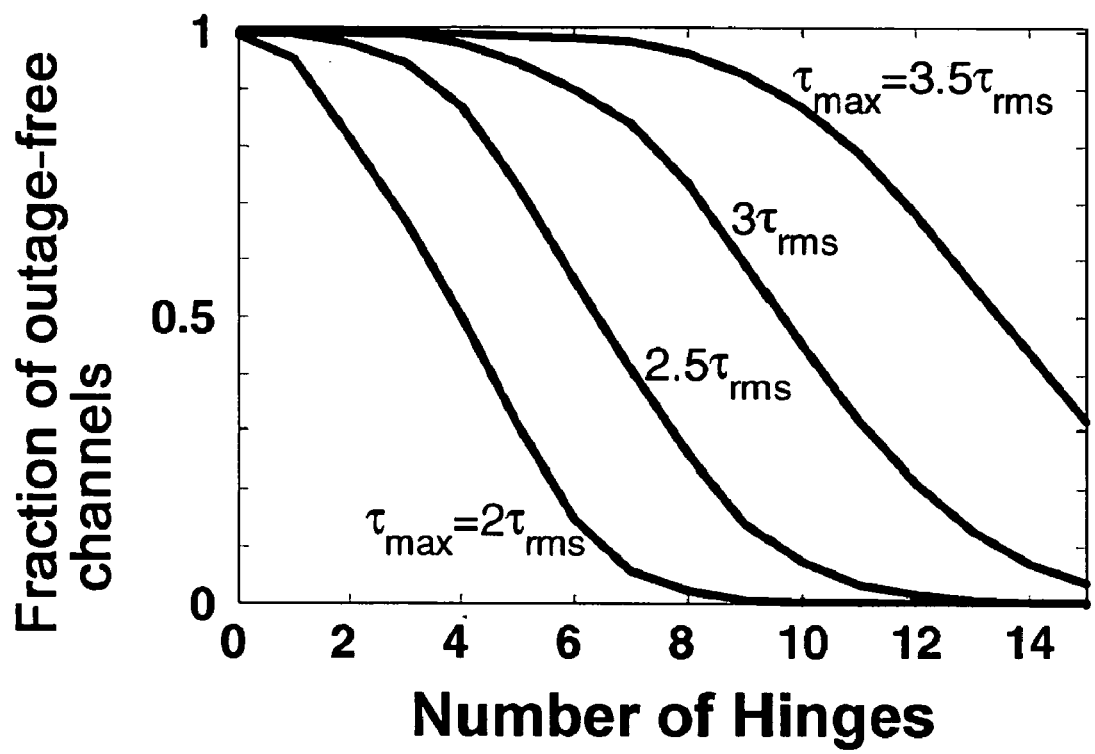
FIG. 9 is a graph 9000 of a fraction of approximately outage-free channels as a function of a number of hinges for various degrees of PMD tolerance.

FIG. 9 is a graph 9000 of a fraction of outage-free channels as a function of a number of hinges for various degrees of PMD tolerance. For a system with small number of degrees of freedom, say N=5, even at a modest PMD tolerance of $\tau_{max}=2.5\tau_{rms}$, 75% of the channels were calculated to be approximately outage-free. The same fraction of channels would not be expected to experience PMD-related outage in a system with N=8 and $\tau_{max}=3\tau_{rms}$. These results point to different ways to address the PMD problem. Indeed, if it were possible to show which channels are approximately outage free (i.e. by means of an in-service PMD monitoring technique), these channels could be used for high availability services over relatively long timescales. In a similar way, if PMD compensation were employed, it need not be used in those channels. Alternatively, in a multi-channel system a few unreliable channels might not be used at all. Increasing the tolerance towards PMD or using a better fiber, so that $\tau_{max}=3.5\tau_{rms}$, will increase the fraction of approximately outage-free channels for N=8 systems from 75% to 96%. Finally, since service level agreements can be written in terms of the outage per month/year, artificially adding degrees of freedom (say, several slow polarization scramblers mid-span) might not solve the PMD problem but can provide more predictable PMD dynamics closer to those described by a Maxwellian distribution over a desired timescale.

A field test was used to determine some statistical implications of the hinge model by analyzing the data taken from a 40 Gb/s 1000 km field test. Observations in the field test indicated that DGD values measured over time on individual channels can be characterized by distinct statistical distributions, whose values averaged over time $<\_>_{time}$ differed by a factor of up to 1.8. That is, while the DGD for each channel varied greatly, one of them, on average, had a DGD almost twice as high as another one. To quantify this spread among different channels standard deviations of statistical ensembles $\{<\_>_{time}\}$ was obtained both experimentally and numerically for a system with differing number of hinges. The excellent agreement between experiment and theory appears to validate a hinge model which indicates that, over timescales for which the fiber between the hinges remain "dead," some channels have a higher probability of outage than others. This is in contrast to a different model, in which any frequency of any fiber is equally likely to suffer an outage. A fraction of "bad" channels for various numbers of hinges in the system was predicted. The field test determined that for a realistic system (less than 15 hinges) 90% of the channels were unlikely to see an outage, but 10% of the channels were likely to see more outages than expected from a Maxwellian statistics.

A commercial ULH system was deployed between two major cities. Two end terminals were placed in switching offices, and five repeaters were installed in small unmanned buildings. These buildings had a temperature controlled environment with a thermostat hysteresis band of about 1° C. Correspondingly, small (1-1.5° C.) and periodic (1-3 hours) temperature variations occurred sporadically and caused DCM to act as strong polarization controllers. These temperature oscillations differed somewhat among the buildings in both amplitude and frequency. Thus, over time, hinges in this exemplary optical network varied in number and strength. In addition, several bridges along the route behaved as diurnal weak hinges.

Figure 10:
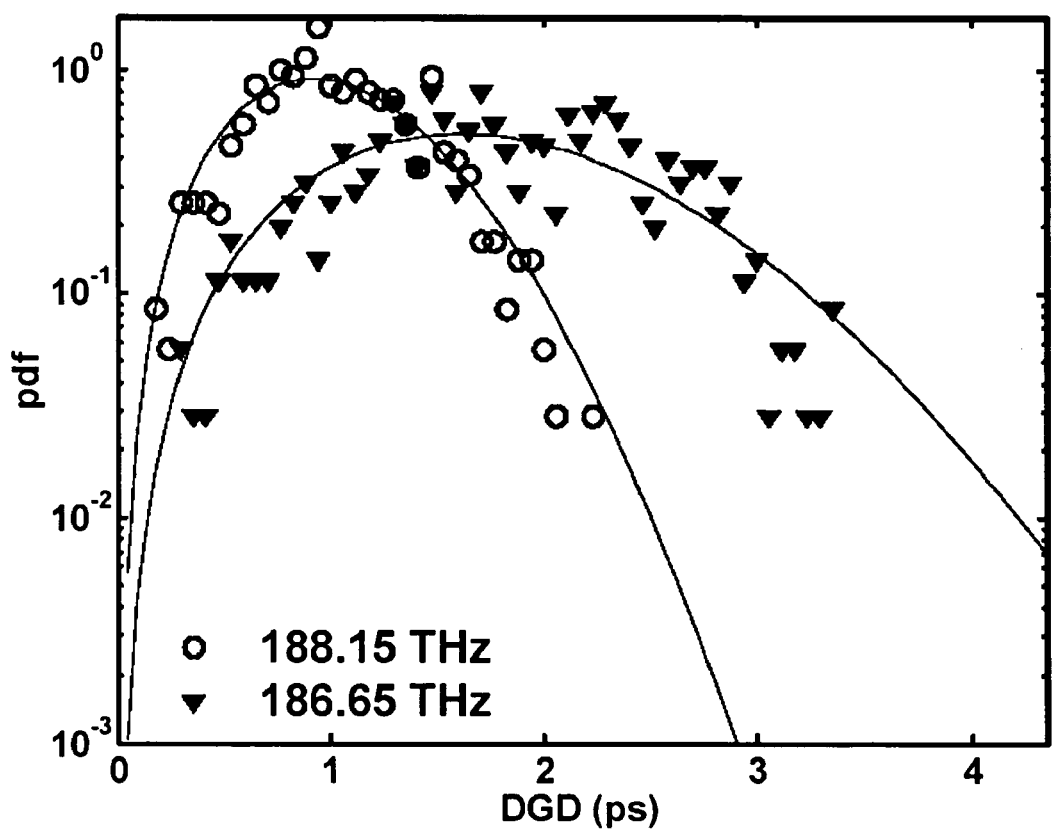
FIG. 10 is a graph 10000 of experimental probability density functions of the DGD for two channels.

FIG. 10 is a graph of experimental probability density functions 10000 for two channels. The data shown were measured for three days over 562 km—the system was looped back at the third repeater, and consecutively passed through repeaters #1-2-3-2-1, for a total of five. During the time of these measurements only the building housing the repeaters 1 and 3 showed strong inside temperature oscillations, thus the system embodied three active hinges. Experimental probability density functions 4000 demonstrate that the DGD at each frequency exhibits a distinct statistical distribution. Time averaged DGDs for the two channels are 1.8 ps and 1.0 ps for 186.65 THz and 188.15 THz, respectively. Other channels (an experimentally available frequency range was limited to 186.5-188.5 THz) had mean values between the two cases shown. Similar behavior was observed in each set of DGD measurements with various system configurations as long as there were temperature variations driving the hinges. When the temperature was stable, the measured DGD did not change. These experimental results can be explained within the framework of the hinge model: the PMD vector at each frequency can be made of several fixed vectors (representing "dead" buried sections) connected by active hinges. These fixed vectors can be larger at 186.65 THz and smaller at 188.15 THz.

Figure 11:
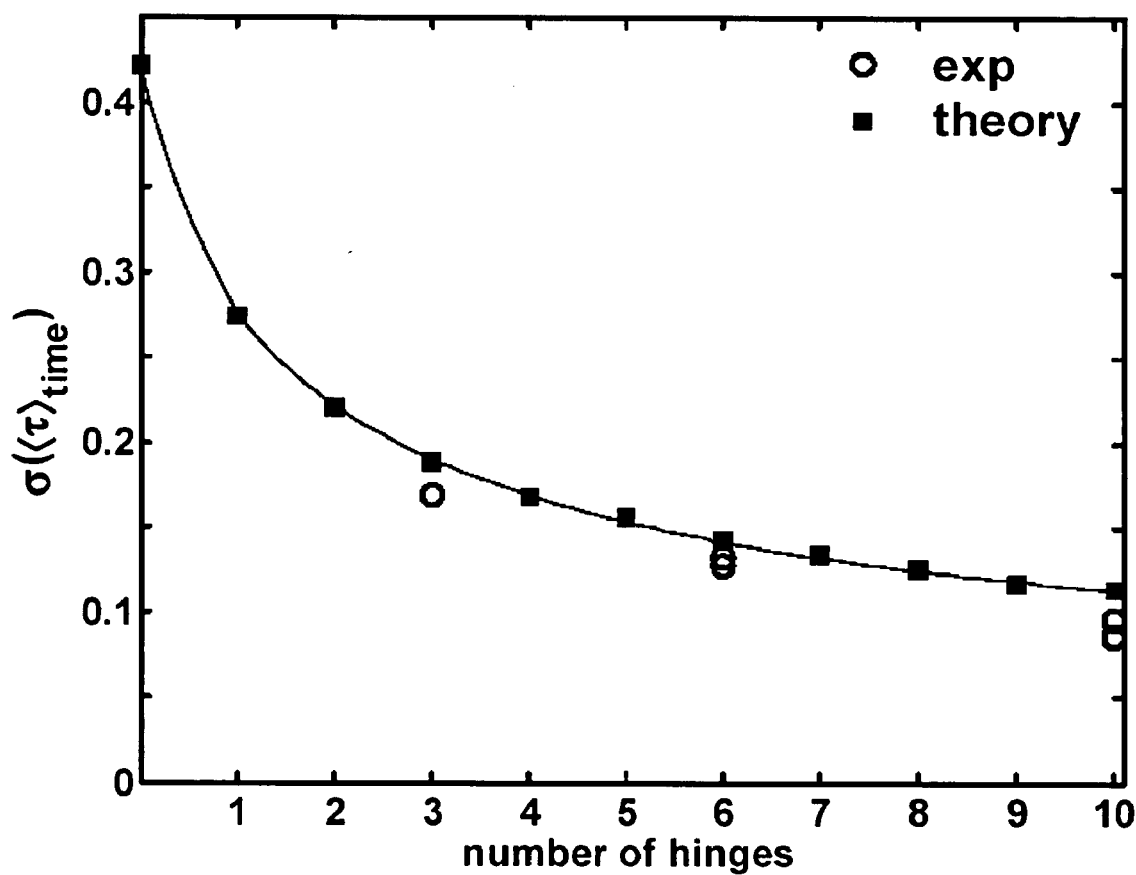
FIG. 11 is a graph 11000 of a DGD standard deviation as a function of a number of hinges in an optical network.

FIG. 11 is a graph 11000 of a DGD standard deviation as a function of a number of hinges in an optical network. To quantify the spread of DGD among different channels DGD values were averaged over time for each frequency, and the standard deviation of the resulting set: $\_(<\_>_{time})$ was computed. The results are plotted versus putative number of hinges in graph 5000 as open circles (_). Also by utilizing an analytical solution for the distribution of a few fixed sections PMD emulator the same quantity $\_(<\_>_{time})$ was numerically estimated for 10,000 fixed-section emulators, whose sections are chosen by a random draw from a Maxwellian distribution. Each configuration of the "emulator" represents an independent frequency in the field test. These estimates are shown in black squares (_). The apparent agreement between the theory and the experiment appears to validate the hinge model.

Although neither of the experimental data sets was large enough to determine the exact shape of the observed distributions, they can be similar to that of a PMD emulator comprising a few sections.

To find out what fraction of the channels had their distribution shifted to higher DGD and thus are more prone to outages, a simulation procedure was devised. The simulation procedure comprised a set of 35,000 fixed section "emulators" and numerically integrated each of their distributions above a certain threshold _th=3 _mean, where _mean is averaged across different emulators (frequencies). Each value obtained was the outage probability for a given channel. For a system with a small number of hinges these values varied among the channels.

Figure 12:
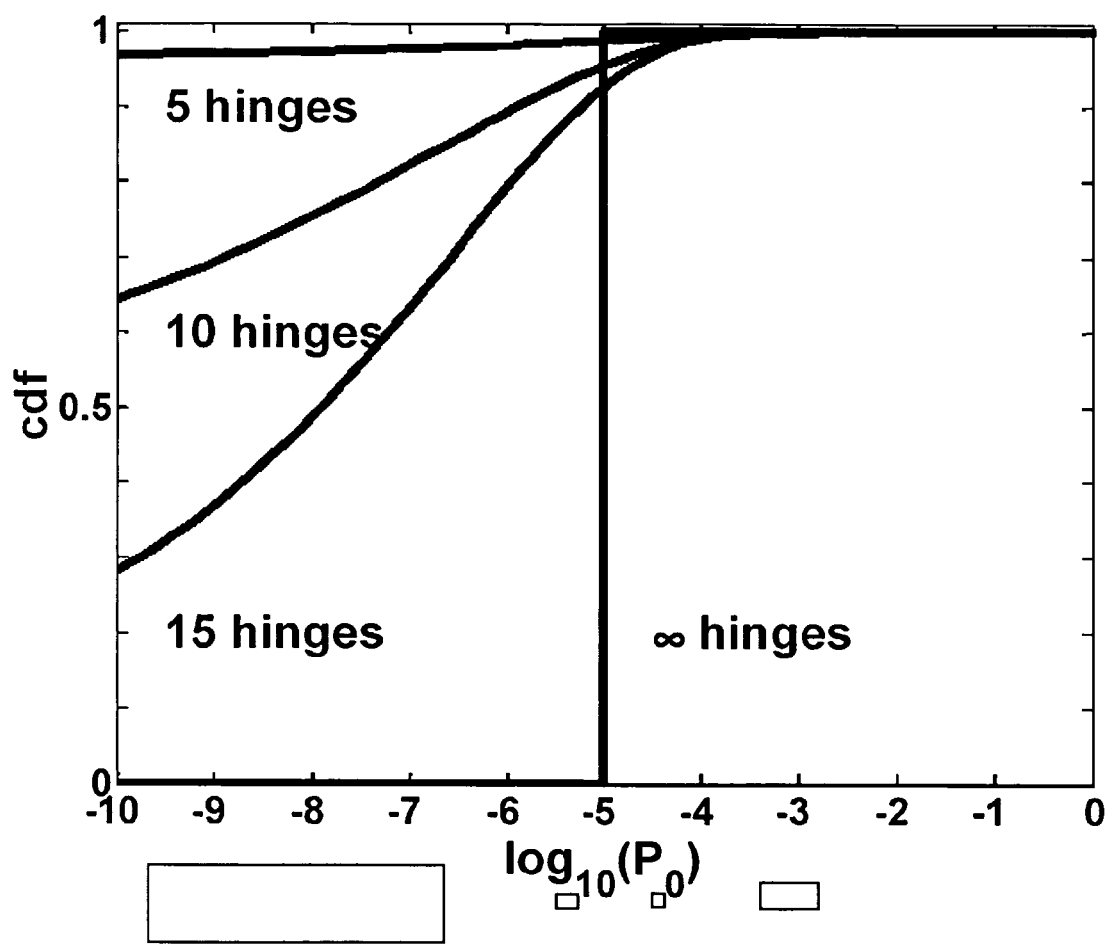
FIG. 12 is a graph 12000 of a cumulative probability functions of outage for a system with 5, 10, 15, and an infinite number of hinges.

FIG. 12 is a graph 12000 of a cumulative distribution function of outage probabilities for a system with 5, 10, 15, and an infinite number of hinges or, in other words, the fraction of channels whose outage probabilities are smaller than the value on the horizontal axis $P_0$. Thus, for an embodiment comprising an infinite number of hinges, every channel appeared to have an outage probability of $10^{-5}$ as expected. For a finite number of hinges, however, a significant portion of the channels had very small outage probability due to the truncation effect from a finite number of sections. In fact, 90% of the channels had outage probability less than $10^{-5}$ for 15 or fewer hinges.

A statistical analysis of data taken on a field deployed telecom system appeared to demonstrate that observed DGD values measured over time on individual channels comprised distinct statistical distributions. This behavior was explainable via a proposed hinge model. The hinge model allowed a prediction of a fraction of optical frequencies which are virtually certain to be free of outages on time scales for which the buried sections remained "dead."

DEFINITIONS

When the following terms are used substantively herein, the accompanying definitions apply:

a—at least one.

activity—an action, act, step, and/or process or portion thereof.

adapted to—capable of performing a particular function.

and/or—either in conjunction with or in alternative to.

apparatus—an appliance or device for a particular purpose.

associated—related to.

automatically—acting or operating in a manner essentially independent of external influence or control. For example, an automatic light switch can turn on upon "seeing" a person in its view, without the person manually operating the light switch.

axis—a reference line from which distances or angles are measured in a coordinate system.

based upon—determined in consideration of.

birefringent plate—a piece of birefringent material cut so as to delay one linear polarization component relative to another by a desired amount (generally either to one-half or one-quarter of the wavelength of interest).

calculate—compute.

can—is capable of, in at least some embodiments.

channel—a wavelength range over which communications signals are transmitted via an optical network.

change—to cause to be different.

combination—two or more values.

comprising—including but not limited to.

convert—to transform.

coordination—an interaction of movements and/or functions.

correct—to remedy.

data—distinct pieces of information, usually formatted in a special or predetermined way and/or organized to express concepts.

define—to establish the outline, form, or structure of.

detect—to sense and/or perceive.

different—substantially distinguishable from.

determine—ascertain, obtain, and/or calculate.

device—a machine, manufacture, and/or collection thereof.

distance—a measure of physical and/or logical separation.

distribute—arrange.

equal—substantially the same as.

error—an unintended result of a signal transmission.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

high availability service—a usage of an optical network in which low downtime is expected.

indication—a sign or token.

indicative—serving to indicate.

information—processed, stored, and/or transmitted data.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initiating—beginning.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instruction—a direction adapted to perform a particular operation or function.

less than—lower in magnitude or degree in comparison to something else.

machine instructions—directions adapted to cause a machine to perform a particular operation or function.

machine readable medium—a physical structure from which a machine can obtain data and/or information. Examples include a memory, punch cards, etc.

Maxwellian distribution—a mathematical expression defining a probability density function via the equation:

$$p_{\Delta\tau}(x)=(2/\pi)^{1/2}(x^2/\tau_{rms}^3)\exp\{-x^2/(2\tau_{rms}^2)\}$$

where: $\tau_{rms}$=the root-mean-square differential group delay (DGD); and x=is a DGD.

may—is allowed and/or permitted to, in at least some embodiments.

measurement—an observed characteristic.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

network operator—a person and/or information device monitoring and/or controlling a communications network.

number—a count.

obtain—to procure and/or receive.

orient—turn or arrange relative to another object.

otherwise—under other circumstances.

over time—during a time interval substantially exceeding thirty seconds.

period—a time interval.

plurality—the state of being plural and/or more than one.

polarization controller—a device adapted to change polarization related to a signal transmitted via an optical network.

polarization mode dispersion—a phenomenon that occurs when different planes of light inside a fiber travel at slightly different speeds, making it impossible to transmit data reliably at high speeds via an optical network.

predetermined—established in advance.

probability density function—a mathematical function serving to represent a probability distribution.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish and/or supply.

pseudo-randomly—of, relating to, and/or being random numbers generated by a definite, nonrandom computational process.

randomly distributed—arranged having no specific pattern.

rate—a quantity measured with respect to another quantity.

receive—accept something provided and/or given.

relative—in comparison with.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

responsive—reacting to an influence and/or impetus.

rotational speed—an angular displacement relative to another object relative to a predetermined time period.

sending—to convey.

set—a related plurality.

setting—a condition and/or value of a parameter and/or variable.

similar—alike and/or nearly identical to.

slowly—performed over a period of time substantially greater than approximately thirty seconds.

statistical parameter—a calculated value related to a plurality of data points. Examples include an average, mean, median, mode, minimum, maximum, integral, local minimum, weighted average, etc.

substantially—to a great extent or degree.

system—a collection of mechanisms, devices, data, and/or instructions, the collection designed to perform one or more specific functions.

temperature change—a measured difference in an amount of heat in a mass.

optical network—a material substance that can be used for the propagation of signals, usually in the form of modulated radio, light, or acoustic waves, from one point to another. A optical network can comprise §fiber-optic cable, twisted-wire pair, coaxial cable, dielectric-slab waveguide, water, and/or air, etc.;

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub-ranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method comprising:

receiving, from a network operator, an instruction to change a setting of a polarization controller, the polarization controller one of a plurality of polarization controllers distributed within an optical network, the instruction not responsive to a detected error in a discrete optical communication, the instruction provided responsive to an indication related to a probability density function associated with a Polarization Mode Dispersion vector;

responsive to the instruction to change the setting of the polarization controller, automatically changing a first rotational speed of a birefringent plate of a plurality of birefringent plates associated with the polarization controller to orient the birefringent plate pseudo-randomly over time with respect to a predetermined axis, the first rotational speed less than about one revolution per thirty seconds, said automatically changing the rotational speed performed with respect to a second rotational speed of at least one other birefringent plate of the plurality of birefringent plates associated with the polarization controller, the second rotational speed less than about one revolution per thirty seconds, wherein said first rotational speed is chosen according to $R \sim 10/(N*T)$, where R is a needed number of rotations per unit time given in terms of the number of polarization controllers N, and the time period T of an Service Level Agreement to be satisfied.

2. The method of claim 1, further comprising:

placing a channel in a high availability service based upon a predetermined Polarization Mode Dispersion vector statistical parameter associated with the probability density function.

3. The method of claim 1, further comprising:

automatically changing a third rotational speed of a third birefringent plate associated with the polarization controller responsive to the probability density function associated with a Polarization Mode Dispersion vector, the third rotational speed less than about one revolution per thirty seconds.

4. The method of claim 1, further comprising:

causing a Polarization Mode Dispersion vector statistical parameter to be substantially similar for all channels associated with the optical network.

5. The method of claim 1, wherein the plurality of polarization controllers are distributed within the optical network at approximately equal distances.

6. The method of claim 1, wherein the plurality of polarization controllers are randomly distributed within the optical network.

7. The method of claim 1, wherein the probability density function approximates a Maxwellian distribution.

8. The method of claim 1, wherein the probability density function is detectably different from a Maxwellian distribution.

9. The method of claim 1, wherein said automatically changing the rotational speed is adapted to change the rotational speed of the birefringent plate to a rate less than about one revolution in a seventy two hour period.

10. The method of claim 1, wherein said automatically changing the rotational speed is adapted to change the rotational speed of the birefringent plate to a rate less than about one revolution in a forty-eight hour period.

11. The method of claim 1, wherein said automatically changing the rotational speed is adapted to change the rotational speed of the birefringent plate to a rate less than about one revolution in a twenty-four hour period.

12. The method of claim 1, wherein said automatically changing the rotational speed is adapted to change the rotational speed of the birefringent plate to a rate less than about one revolution in a twelve hour period.

13. The method of claim 1, wherein said automatically changing the rotational speed is adapted to change the rotational speed of the birefringent plate to a rate less than about one revolution in a six hour period.

14. The method of claim 1, wherein said automatically changing the rotational speed is adapted to change the rotational speed of the birefringent plate to a rate less than about one revolution in a three hour period.

15. The method of claim 1, wherein said automatically changing the rotational speed is adapted to change the rotational speed of the birefringent plate to a rate less than about one revolution in a one hour period.

16. The method of claim 1, wherein said automatically changing the rotational speed is adapted to change the rotational speed of the birefringent plate to a rate less than about one revolution in a thirty minute period.

17. The method of claim 1, wherein said automatically changing the rotational speed is adapted to change the rotational speed of the birefringent plate to a rate less than about one revolution in a one minute period.

18. A method comprising:
    installing a plurality of polarization controllers within an optical network; and
    programming at least one polarization controller of the plurality of polarization controllers to receive an instruction for a setting change, the instruction not responsive to a detected error in a discrete optical communication, the instruction provided responsive to an indication related to an estimated Maxwellian probability density function associated with a Polarization Mode Dispersion vector, the at least one polarization controller adapted to, responsive to the instruction to slowly automatically change a rotational speed of a birefringent plate of a plurality of birefringent plates associated with each polarization controller, each rotational speed changed to orient the birefringent plate pseudo-randomly over time with respect to a predetermined axis, each rotational speed less than about one revolution per thirty seconds;
    wherein said first rotational speed is chosen according to $R \sim 10/(N*T)$, where R is a needed number of rotations per unit time given in terms of the number of polarization controllers N, and the time period T of an Service Level Agreement to be satisfied.

19. A computer-readable medium comprising machine instructions capable of being executed by a computer for activities comprising:
    receiving, from a network operator, an instruction to change a setting of a polarization controller, the polarization controller one of a plurality of polarization controllers distributed within an optical network, the instruction not responsive to a detected error in a discrete optical communication, the instruction provided responsive to an indication related to a probability density function associated with a Polarization Mode Dispersion vector;
    responsive to the instruction to change the setting of the polarization controller, automatically changing a first rotational speed of a birefringent plate of a plurality of birefringent plates associated with the polarization controller to orient the birefringent plate pseudo-randomly over time with respect to a predetermined axis, the first rotational speed less than about one revolution per thirty seconds, said automatically changing the rotational speed performed with respect to a second rotational speed of at least one other birefringent plate of the plurality of birefringent plates associated with the polarization controller, the second rotational speed less than about one revolution per thirty seconds;
    wherein said first rotational speed is chosen according to $R \sim 10/(N*T)$ where R is a needed number of rotations per unit time given in terms of the number of polarization controllers N, and the time period T of an Service Level Agreement to be satisfied.

* * * * *